US 9,910,997 B1

(12) United States Patent
Brail et al.

(10) Patent No.: US 9,910,997 B1
(45) Date of Patent: Mar. 6, 2018

(54) SECURE CREDENTIAL STORAGE

(71) Applicant: Google Inc., Mountain View, CA (US)

(72) Inventors: Gregory Brail, Palo Alto, CA (US); Subramanian Kumaraswamy, Cupertino, CA (US); Randy T. Solton, Berkeley, CA (US); Jeffrey A. West, San Jose, CA (US)

(73) Assignee: Google LLC

( * ) Notice: Subject to any disclaimer, the term of this patent is extended or adjusted under 35 U.S.C. 154(b) by 0 days.

(21) Appl. No.: 14/581,787

(22) Filed: Dec. 23, 2014

(51) Int. Cl.
```
G06F 7/04       (2006.01)
G06F 15/16      (2006.01)
G06F 17/30      (2006.01)
G06F 21/62      (2013.01)
G06F 21/60      (2013.01)
H04L 9/08       (2006.01)
G06F 21/44      (2013.01)
```

(52) U.S. Cl.
CPC .............. *G06F 21/62* (2013.01); *G06F 21/44* (2013.01); *G06F 21/602* (2013.01); *H04L 9/0894* (2013.01)

(58) Field of Classification Search
CPC ......... H04L 9/0894; G06F 21/44; G06F 21/62
USPC ............................................................ 726/5
See application file for complete search history.

(56) References Cited

U.S. PATENT DOCUMENTS

| | | | | |
|---|---|---|---|---|
| 7,823,192 B1 * | 10/2010 | Fultz | ........................ | G06F 21/33 709/225 |
| 8,296,828 B2 * | 10/2012 | Dalzell | ................... | G06F 21/41 713/168 |
| 2003/0147536 A1 * | 8/2003 | Andivahis | ............... | H04L 63/06 380/277 |
| 2004/0059590 A1 * | 3/2004 | Mercredi | ............ | H04L 63/0815 726/5 |
| 2005/0097330 A1 * | 5/2005 | Lundblade | .............. | G06F 21/33 713/176 |
| 2007/0245148 A1 * | 10/2007 | Buer | ...................... | H04L 9/3271 713/182 |
| 2008/0196101 A1 * | 8/2008 | Sade | ........................ | G06F 21/41 726/22 |
| 2011/0099384 A1 * | 4/2011 | Grange | ................. | H04L 9/0897 713/184 |
| 2011/0231659 A1 * | 9/2011 | Sinha | ...................... | H04L 63/06 713/168 |
| 2013/0160147 A1 * | 6/2013 | Draluk | .................... | G06F 21/51 726/30 |
| 2014/0189808 A1 * | 7/2014 | Mahaffey | ............ | H04L 63/0853 726/4 |

OTHER PUBLICATIONS

Vipin Samarl; Single Sign-On Using Cookies for Web Applications; IEEE; Year: 1999.*

* cited by examiner

*Primary Examiner* — Monjour Rahim

(74) *Attorney, Agent, or Firm* — Fish & Richardson P.C.

(57) ABSTRACT

Securing a credential is disclosed. A reference to the credential that will provide access to a service is stored in a credential store. The credential from the credential store is provided to an application execution platform having access to the credential store. The application execution platform includes an interface to access the service using the credential. Application code that references the credential stored in the credential store is stored in a code repository.

20 Claims, 4 Drawing Sheets

US 9,910,997 B1

SECURE CREDENTIAL STORAGE

BACKGROUND OF THE INVENTION

Applications, scripts, and other programs often need to connect to services that are secured by security credentials. For example, a backend service utilized by an application may require a valid username and password to access the service. Often the security credentials are stored directly in program code programmed to access the service and care must be exercised to protect the program code to ensure that only those authorized to have access to the security credentials can have access to the program code. However, the program code may be inadvertently exposed to others that should not have access to the security credentials. For example, the program code may be emailed to an unsecure destination or checked into a code repository that is publically accessible. Therefore, there exists a need for a way to securely manage and utilize security credentials.

BRIEF DESCRIPTION OF THE DRAWINGS

Various embodiments of the invention are disclosed in the following detailed description and the accompanying drawings.

DETAILED DESCRIPTION

Figure 1:
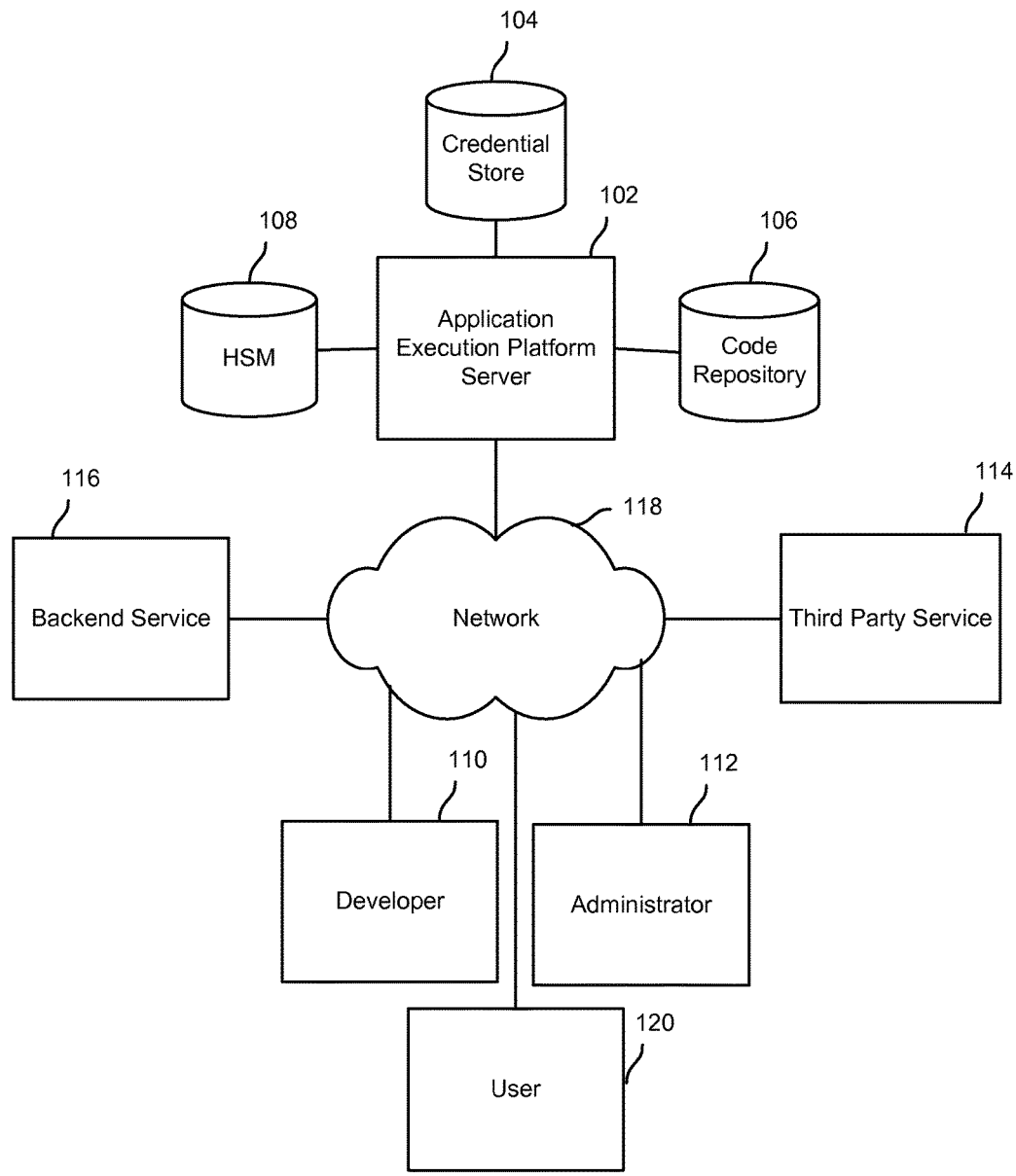
FIG. 1 is a block diagram illustrating an embodiment of an application execution platform environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Securing credentials is disclosed. In various embodiments, a credential store includes storage for storing a credential that will provide access to a service and an interface to provide the credential. For example, the credential store is accessible via a network interface and is utilized to securely store security credentials to be utilized during execution of application code within an application execution platform. By storing the security credentials to be utilized in the credential store rather than in unsecured program code of the application, the threat of accidentally revealing the security credentials via the program code is mitigated. The interface of the credential store may allow authorized applications, processes, and other programs to securely register, obtain and utilize the stored credential as needed.

In some embodiments, an application execution platform having access to the production credential store includes an interface to receive the key from the production credential store, an interface to access the service, and a code repository to store application code. For example, the application execution platform provided at least in part by a server allows application program code stored in the code repository to be executed within its execution environment. In some embodiments, security credentials stored in the production credential store are only accessible within the application execution platform. In some embodiments, an insecure code repository storing the application code cannot access the service without having access to the production credential store. For example, only application code running on the application execution platform is able to access stored security credentials to access services external to the application execution platform. In some embodiments, the code repository stores and hosts application code that interacts with external program code via an Application Programming Interface (i.e., API) to allow the external program to access backend services.

The interfaces of the production credential store and application execution platform may be hardware and/or software API interfaces, communication interfaces, and/or network interfaces. Credentials may include one or more of the following: security certificate, password, user identifier, username, email address, encryption key, decryption key, security certificate, access key, multifactor authentication information, biometric data, and any other data that may be utilized to prove authentication, permission, and/or identity.

FIG. 1 is a block diagram illustrating an embodiment of an application execution platform environment. Application execution platform server 102 is connected to backend service 116, developer 110, administrator 112, user 120, and third-party service provider 114 via network 118. Application execution platform server 102 is connected to credential store 104, code repository 106 and hardware security module 108.

Often, providers want to make their backend services available on the web so that these services can be consumed by application running on mobile devices and desktops. For example, an organization might want to expose its services that provide product pricing and availability information, sales and ordering services, order tracking services, and any other services required by client apps by exposing services as a set of web endpoints. Client application developers (e.g., developer of developer 110) may then make web requests to these endpoints in developed application code. The client applications that consume these services can be implemented as standalone apps for a mobile device or tablet, as web apps running in a browser, or as any other type of application that can make a request to a web endpoint and consume any response data. These applications might be developed and released by the same organization that exposed the services or by third-party app developers who make use of publicly available services.

Developers also face challenges when trying to consume services from different providers. The same client application might have to use one mechanism to consume a service from one provider, and a different mechanism to consume a service from a different provider. Developers must ensure that they have taken all necessary steps to secure and protect their services from unauthorized access. Security credentials also have to be carefully managed to ensure that security credentials required to utilize services do not become compromised by unauthorized users. After a client application that accesses services has been released, a service provider is then required to make sure that those services continue to function over time as they add, modify, or delete those services. The service provider must also have a way to keep developers aware of any changes to the services to ensure that client apps stay in sync with those services.

In some embodiments, application execution platform server 102 enables secure access to backend service 116 via an API (e.g., well-defined API that is consistent across services, regardless of service implementation) hosted by server 102. For example, rather than having a client application (e.g., application of user 120) access backend service 116 directly, the client application accesses server 102 that functions to map a publicly available web endpoint via an API to backend service 116. Backend server 116 may include any service provider and/or content repository of an organization. In some embodiments, in effect, server 102 acts as a proxy for content and/or server provided by backend service 116. In some embodiments, developer 110 provides application code that will implement functionality of an API provided by server 102 to access services of backend service 116. For example, a mobile application executed by user 120 interacts with application code provided by developer 110 (e.g., API implementing code provided by developer 110) and implemented on server 102 to access services of backend service 116. In some embodiments, backend service 116 is optional and application code provided by developer 110 provides functionality without accessing backend service 116. In some embodiments, developer 110 also programs a user application executed by user 120 to access services of server 102. For example, developer 110 develops both a user application to be executed by user 120 and application code executed by server 102 that interfaces with the user application to provide access to backend service 116. The application code (e.g., compiled program, uncompiled program, source code, script, API implementation code, etc.) provided by developer 110 may be stored by server 102 in code repository 106.

In some embodiments, server 102 is able to handle the security and authorization tasks required to protect backend services, as well as to analyze, monitor, and monetize the services. Because applications of developers make requests to server 102, rather than directly to backend server 116, developers do not need to know the implementation detail of backend service 116. Thus server 102 may allow isolation of developers from backend services. In some embodiments policies on server 102 are utilized to add functionality to a service without having to make any changes to the backend service. For example, policies may be added to perform data transformations and filtering, add security, execute conditional logic or custom code, and to perform many other actions. In another example, access may be revoked/modified so that a particular user application no longer has full access to the backend services. In some embodiments, server 102 provides tools for adding and configuring APIs, applications, and related policies. In some embodiments, server 102 is deployed within the computing environment of backend service 116. In some embodiments, server 102 is deployed in the cloud (SaaS) where multiple entities may share server 102.

In some embodiments, code repository 106 stores program code to be executed/implemented by server 102. For example, one or more developers provide application code (e.g., code implementing one or more APIs) to be executed by server 102. In some embodiments, application code provided by developer 110, stored in code repository 106, and/or executed by server 102 may access third-party services provided by third-party service 114. For example, content is obtained from third-party service 114 that is controlled by an entity external to an entity of backend server 116, server 102, and user 120.

In some embodiments, program code provided by developer 110 may need to access backend server 116 and/or third-party service 114 using one or more security credentials. For example, backend service 116 and/or third party server 114 may require a valid username and password login to access its services. Although the credential may be directly specified in application code that is to utilize the credentials to access a desired service (e.g., stored directly within code provided by developer 110), storing security credentials in unsecured program code exposes the credentials to vulnerabilities. For example, the code may be stored by developer 110 in a third party code version control repository (e.g., insecure public repository) and the program code may unintentionally become exposed to unauthorized parties via the third party code repository. Additionally in some cases, it may not be desirable to expose credentials to a developer. For example, it may be desirable to enable a developer to develop code without direct knowledge of security credentials.

In some embodiments, credentials are stored in credential store 104. For example, security credentials to be utilized by application code executed by server 102 are stored in credential store 104. The credentials may be provided by developer 110 and/or administrator 112 (e.g., by allowing administrator 112 to provide security credentials, developer 110 does not need to possess direct knowledge of the credentials). In some embodiments, credentials are provided for storage in credential store 104 via an API. In some embodiments, each stored security credential is associated with a reference identifier that can be utilized to identify the specific credential. For example, instead of directly including security credentials in application code, a reference to the security credentials may be utilized to reference the security credentials. When the application code is later executed, the reference may be utilized to obtain the referenced security credentials for use.

In some embodiments, only computer code executing on application execution platform server 102 has access to obtain credentials stored in credential store 104. For example, once security credentials are provided to credential store 104 for storage, the stored credentials may be only obtained from the credential store by code executing within an application execution environment provided by server 102. In some embodiments, connection between server 102 and credential store 104 is a physically secure connection. For example, a direct physical connection that is not connected to other components connects server 102 and credential store 104. In some embodiments, server 102 has exclusive access to obtain credentials from credential store 104. Sever 102 may host a plurality of different execution environments. In some embodiments, each credential stored in credential store 104 is scoped to one or more execution environments and may only be utilized by code executing within a scoped execution environment.

In some embodiments, credentials stored in credential store 104 are encrypted. In some embodiments, security credentials stored in credential store 104 are encrypted using a plurality of different encryption keys. For example, security credentials for each different organization and/or execution environment are encrypted using an encryption key unique to the organization/environment. In some embodiments, encryption keys utilized to encrypt security credentials stored in credential store 104 are stored and encrypted in hardware security module 108. In some embodiments, hardware security module 108 is a dedicated physical crypto processing device that safeguards and manages encryption keys. Access to hardware security module 108 may be protected by a master encryption key. In an alternative embodiment, rather than utilizing hardware security module 108, a storage that stores a master key encrypted encryption keys is utilized.

Although the example of FIG. 1 shows code repository 106, credential store 104, and hardware security module 108 separately and directly connected to server 102, one or more of these components may be integrated together in a single physical device. In some embodiments, code repository 106, credential store 104, and hardware security module 108 may be connected to network 118, and server 102 accesses them via network 118. Each of code repository 106, credential store 104, and hardware security module 108 may include one or more hardware and/or software interfaces to store and/or obtain data. Examples of code repository 106, credential store 104, and hardware security module 108 include a storage device, a secure storage, a server, a database, a distributed storage, a data structure, and any other type of storage or computing device. In some embodiments, one or more of the components shown in FIG. 1 each represent multiple devices. For example, server 102 represents a cluster of application execution environment servers and backend service 116 represents a cluster of backend service servers.

Any of the components shown in FIG. 1 may represent one or more physical devices. For example, backend service 116, developer 110, user 120, administrator 112, and third party service 114 each represent a different computer device. Any of the components shown in FIG. 1 may be integrated together with one or more other components shown in FIG. 1 and/or a component not shown in FIG. 1. For example, developer 110 and administrator 112 may be integrated on the same physical device. Examples of the server 102, backend service 116, third party service 114, developer 110, user 120, and administrator 112 include a server, a personal computer, a desktop computer, an electronic reader, a laptop computer, a storage, a smartphone, a tablet computer, a mobile device, a wearable device, a wearable computer, and any other computer or electronic device. Examples of network 118 include one or more of the following: a direct or indirect physical communication connection, mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. Other communication paths may exist and the example of FIG. 1 has been simplified to illustrate the example clearly. Although single instances of components have been shown to simplify the diagram, additional instances of any of the components shown in FIG. 1 may exist. Components not shown in FIG. 1 may also exist to perform and provide functions and services described in this document.

Figure 2:
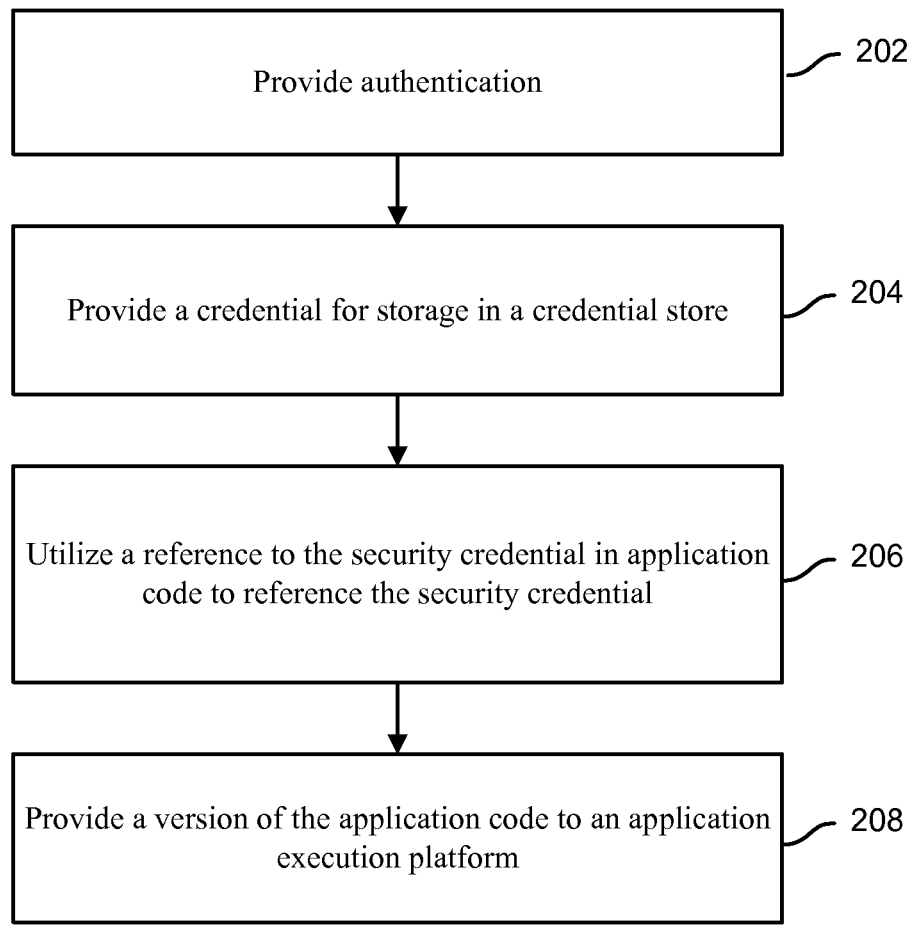
FIG. 2 is a flowchart illustrating an embodiment of a process for providing security credentials for storage.

FIG. 2 is a flowchart illustrating an embodiment of a process for providing security credentials for storage. The process of FIG. 2 may be implemented on devices of developer 110 and/or administrator 112 of FIG. 1.

At 202, authentication is provided. In some embodiments, the authentication is provided to a server (e.g., server 102 of FIG. 1) and/or a credential store (e.g., credential store 104 of FIG. 1). In some embodiments, the authentication authorizes that a provider is authorized to provide a credential for storage. For example, developer 110 and/or administrator 112 of FIG. 1 desires to provide one or more security credentials to be stored in a credential store for future use and provides the authentication to prove the authorization/identity of the provider. In some embodiments, providing the authentication includes providing a user identifier and a password to authenticate with server 102 and/or security credential store 104 of FIG. 1. Other examples of the authentication include a security certificate, security key, multifactor authentication information, biometric data, or any other data that may be utilized to prove authentication, permission, and/or identity. In some embodiments, the authentication is provided using an application interface. For example, an API call that provides the authentication is provided. The authentication may be provided via program code, command line commands, a web interface, and/or a graphical command interface.

In some embodiments, the authentication identifies the identity, organization, role, privileges, and/or execution environment of a credential to be provided. For example, the authentication includes a user identifier that identifies an organization, role, privileges, and/or execution environment of a credential to be provided. In some embodiments, a credential stored in a credential store is scoped to a specific account, user, organization, role, privileges, and/or execution environment and may be only utilized by or within its scope. In some embodiments, in the event the provided authentication is an invalid authentication, an error message is received and the process ends.

At 204, a credential is provided for storage in a credential store. For example, once a user and/or system has been authenticated, the user/system is able to provide one or more security credentials to be stored in the credential store for future use. In some embodiments, the security credentials are provided via an encrypted communication channel (e.g., using Transport Layer Security connection). The provided credentials may include one or more of the following: security certificate, password, user identifier, username, email address, encryption key, decryption key, access key, multifactor authentication information, biometric data, and any other data that may be utilized to prove authentication, permission, and/or identity. In some embodiments, providing the credential includes providing a desired reference identifier of the credential. For example, the reference identifier may be utilized to reference the credential instead of directly specifying the credential when developing application code. In some embodiments, the reference identifier is automatically assigned by the recipient of the security credential rather than being provided. The reference identifier may be stored with the credential in the credential store.

In some embodiments, the security credentials are provided via an API. For example, an API command that provides the security credentials is provided. In some embodiments, the provided security credentials cannot be obtained external to an application execution environment once the security credentials have been stored. For example, the API is a write only API utilized to provide the security credential, and the API does not provide an interface to obtain the security credential to a recipient external to a secure execution platform of the credential store. The stored credential may be only accessed locally within the secure execution platform. In the example of FIG. 1, once security credentials are stored in a storage such as credential store 104, the credentials can only be obtained by server 102 of FIG. 1 for execution in its local execution environment and cannot be obtained from credential store 104 by developer 110, user 120 or administrator 112.

The security credentials may be provided via program code, command line command, a web interface, and/or a graphical interface. In some embodiments, the providing a security credential includes providing a scope identifier of an account, user, organization, role, privileges, credential grouping (e.g., credential vault name), and/or execution environment associated with the provided credential. For example, an authenticated user may specify that the credential may only be accessed and utilized within a certain execution environment and the security credential is configured to be only accessible within the specified execution environment. In some embodiments, the scope identifier is a subset of an entity identified using the received authentication. For example, although a security credential may be scoped for only use by application code of a particular user/organization account identified by the received authentication, the credential may be even further sub scoped using the received scope identifier that restricts its use within a specific execution environment of a plurality of execution environments of the user/organization account.

At 206, a reference to the security credential is utilized in application code to reference the security credential. For example, a security credential has been stored in a credential store for secure management and use, a reference to the security credential is utilized in developing application code that needs to access the security credential rather than placing the actual security credential within the application code. In some embodiments, referencing the security credential includes utilizing an API that will provide a security credential identified by the reference when executed. For example, a developer programs code that calls a function (e.g., API function) with the reference as one of the function arguments, and when the code is executed, the function returns the security credential identified by the reference. Other arguments of the function may include a scope identifier such as an identifier of an account, user, organization, role, privileges, credential grouping (e.g., credential vault name), and/or execution environment. For example, only credentials of the identified scope are accessible, and in the event the referenced credential does not belong to the identified scope, an error message may be received. The reference may have been selected by a developer/administrator or automatically assigned and returned by a credential store when the security credential was provided for storage in 204.

In some embodiments, grouping of stored credentials are grouped together as "vaults" and credentials within the same "vault" are scoped together. For example, "vaults" may be scoped for only use by a specified organization and/or a specific execution environment of the organization. By allowing a signal organization to have multiple execution environments, each environment is able to be scoped for different security requirements.

In some embodiments, other function calls (e.g., API calls) may be utilized to manage, list, and/or query stored credentials available for use. Below are example code and commands that may be utilized to perform various credential store commands.

Retrieve the names of all the secure stores:
GET /o/{organization}/vaults
Retrieve a list of entries (but not their encrypted values) from a named vault:
GET /o/{organization}/vaults/{name}
Retrieve a single entry (but not its encrypted value):
GET /o/{organization}/vaults/{name}/entries/{entryname}
Create a new vault named "name" with no values:
POST /o/{organization}/vaults
{"name": "{name}"}
curl https://api.enterprise.apigee.com/v1/o/testorg/vaults
H "Content-Type: application/json"
d'{"name": "test2"}'-X POST
POST /o/{organization}/vaults/{vaultname}/entries
Place a new entry in the vault with the specified name and secure value:
POST /o/{organization}/vaults/{vaultname}/entries
{"name":"{entryname}", "value": "{securevalue}"}
curl https://api.enterprise.apigee.com/v1/o/testorg/vaults/test2/entries
H "Content-Type: application/json"
d'{"name": "value1", "value": "verysecret"}'-X POST
Replace the value of the specified entry with a new value:
curl
https://api.enterprise.apigee.com/v1/o/testorg/vaults/test2/entries/value1
d 'verymoresecret'-X PUT
Return "true" if the specified value matches what is already in the store, and "false" if it does not. In both cases, an HTTP status code of 200 is used. This may be used to validate the contents of the store. Note that once stored, there is no API to retrieve the unencrypted value.
curl
https://api.enterprise.apigee.com/v1/o/testorg/vaults/test2/entries/value1?a ction=verify
d 'verymoresecret'-X POST
Delete the specified vault entry:
DELETE/o/{organization}vaults/{vaultname}/entries/{entryname}
Delete the entire vault:
DELETE/o/{organization}/vaults/{name}
Below are example code/commands that may be utilized to retrieve, store, scope, and delete credentials by organization and execution environments.
GET /o/{organization}/e/{env}vaults
GET /o/{organization}/e/{env}/vaults/{name}
GET /o/{organization}/e/{env}/vaults/{name}/entries/{entryname}
POST /o/{organization}/e/{env}/vaults
POST /o/{organization}/e/{env}/vaults/{vaultname}/entries
PUT/o/{organization}/e/{env}/vaults/{vaultname}/entries/{entryname}

POST
/o/{organization}/e/{env}/vaults/{vaultname}/entries/
{entryname}?action=ve rify
DELETE/o/{organization}/e/{env}/vaults/{vaultname}/
entries/{entryname}
DELETE/o/{organization}/e/{env}/vaults/{name}

In some embodiments, the "getVault( )" method is utilized to retrieve a particular vault, either per organization or based on the current environment. The "getVault( )" method takes two parameters: the name of the secure store to retrieve and the scope, which may identify a specific organization or environment (if not specified, then organization is assumed). The object returned by "getVault( )" has two methods:

getKeys(callback): Return an array containing the names of all the keys in the specified vault. The callback function will be called with two arguments: An error if the operation fails, or "undefined" if it does not, and the actual array as the second argument.

get(key, callback): Return the secure value associated with a particular key. The callback function will be called with two arguments: An error if the operation fails, or "undefined" if it does not, and the actual value as the second argument.

An example usage code of "getVault( )" is below.

```
var apigee=require('apigee-access');
    var orgVault=apigee.getVault('vault1', 'organization');
    orgVault.get('key1', function(err, secretValue) {
    // use the secret value here
});
```

At 208, a version of the application code is provided to an application execution platform. For example, application code that utilizes the reference to reference and obtain the credential is a part of application code that implements an API and the application code (e.g., compiled program, uncompiled program, source code, script, API implementation code, etc.) is provided to the application execution platform for execution. For example, in the example of FIG. 1, application code developed by developer 110 is provided to server 102 for storage in code repository 106 for execution by server 102. In some embodiments, the application code that utilizes the reference to credential may only function within a local execution environment of the application execution platform (e.g., platform of server 102 of FIG. 1) to prevent the stored credential from being exposed to unsecure environments. In some embodiments, when the application code is executed by the application execution platform, the application execution platform provides the security credential identified by the reference to allow the application code to utilize the credential to access a desired service that requires the credential for authentication.

Figure 3:
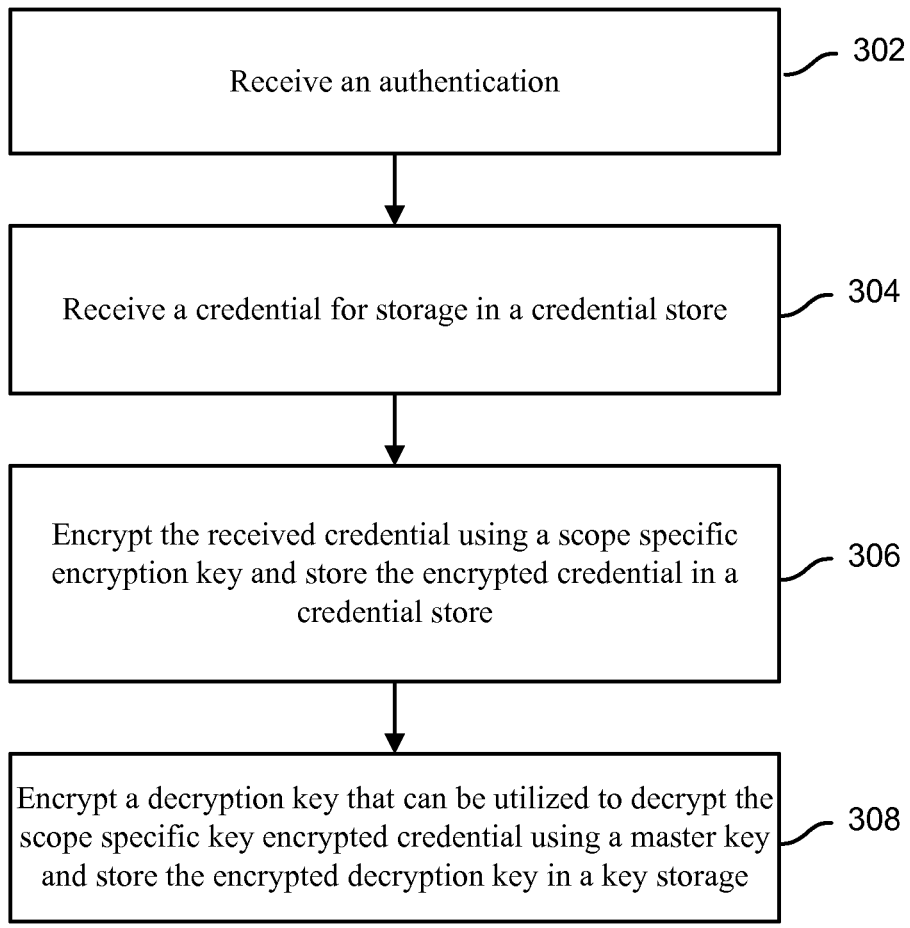
FIG. 3 is a flowchart illustrating an embodiment of a process for storing security credentials in a credential store.

FIG. 3 is a flowchart illustrating an embodiment of a process for storing security credentials in a credential store. The process of FIG. 3 may be implemented on credential store 104 and/or server 102 of FIG. 1.

At 302, an authentication is received. In some embodiments, the received authentication is the authentication provided in 202 of FIG. 2. In some embodiments, the authentication is received from developer 110 and/or administrator 112 of FIG. 1. In some embodiments, the authentication identifies a provider that is to provide a security credential for storage. For example, developer 110 and/or administrator 112 of FIG. 1 desires to provided one or more security credentials to be stored in a credential store for future use and provides the authentication to prove the authorization/identity of the provider. In some embodiments, providing the authentication includes a user identifier and a password to authenticate with server 102 and/or security credential store 104 of FIG. 1. Other examples of the authentication include a security certificate, security key, multifactor authentication information, biometric data, or any other data that may be utilized to prove authentication, permission, and/or identity. In some embodiments, the authentication is received via an interface of an application execution platform. In some embodiments, the authentication is received via an API. For example, an API call that provides the authentication is received. The authentication may be received via program code, command line commands, a web interface, and/or a graphical command interface.

In some embodiments, the authentication identifies the identity, account, organization, role, privileges, and/or execution environment of a security credential to be received. For example, the authentication includes an identifier that identifies an organization, role, privileges, and/or execution environment of a credential to be provided. In some embodiments, the received authentication is verified to ensure that the provider is authorized to provide a credential for storage. In the event the received authentication is an invalid authentication, an error message is provided to the provider and the process ends. In some embodiments, a credential stored in a credential store is to be scoped to a specific account, user, organization, role, privileges, and/or execution environment and may be only utilized by or within its scope. The received authentication may be utilized to determine at least a portion of the scope of a security credential to be stored. For example, the authentication identifies an organization, and a credential to be received will be scoped to the identified organization.

At 304, a credential is received for storage in a credential store. In some embodiments, the received credential is the credential provided in 204 of FIG. 2.

For example, an authenticated user/system provides one or more security credentials for storage in the credential store for future use. In some embodiments, the security credentials are received via an encrypted communication channel (e.g., using Transport Layer Security connection). The received credential may include one or more of the following: security certificate, password, user identifier, username, email address, encryption key, decryption key, access key, multifactor authentication information, biometric data, and any other data that may be utilized to prove authentication, permission, and/or identity. In some embodiments, the received credential includes a reference identifier of the credential. For example, the reference identifier may be utilized to identify the credential when developing code that utilizes the credentials.

In some embodiments, the credentials are received via an API. For example, an API command that provides the credentials is received. In some embodiments, the received credentials cannot be obtained external to an application execution platform once the credentials have been stored. In the example of FIG. 1, once security credentials are stored in a storage such as credential store 104, the credentials can only be obtained within the local application execution platform of server 102 of FIG. 1 and cannot be obtained from credential store 104 by developer 110, user 120 or administrator 112. The credentials may be received via program code, command line commands, a web interface, and/or a graphical command interface.

In some embodiments, the receiving the security credential includes receiving a scope identifier of an account, user, organization, role, privileges, credential grouping (e.g., credential vault name), and/or execution environment associated with the provided security credential. For example, an authenticated user may specify that a credential may only be accessed and utilized within a certain execution environment and the security credential is configured to be only accessible within the specified execution environment. In some embodiments, the scope identifier is a subset of an entity identified using the received authentication. For example, although a security credential may be scoped for only use by application code of a particular user/organization identified by the received authentication, the credential may be even further sub scoped using the received scope identifier that restricts its use within a specific execution environment of a plurality of execution environments of the user/organization.

At 306, the received credential is encrypted using a scope specific encryption key and stored in a credential store. In some embodiments, the credential stored in a credential store is to be scoped to a specific account, user, organization, role, privileges, and/or execution environment and may be only utilized by or within its scope. In some embodiments, credentials stored in the credential store are encrypted using different scope encryption keys that are each associated with a specific account, user, organization, role, privileges, and/or execution environment. The credentials stored in the credential store may be encrypted using a common encryption key to prevent an unauthorized access. However, in the event the common encryption also becomes compromised, every credential stored in the credential store may be at risk. By encrypting security credentials stored in the credential store that belong to a specific account, user, organization, role, privileges, and/or execution environment using a unique encryption key (e.g., security credentials of a single organization are encrypted using the same key but security credentials of different organizations are encrypted using different keys), credentials are isolated into encryption groups that mitigate the number of security credentials that becomes compromised when one encryption key becomes compromised. For example, a plurality of different organizations may share one credential store and credentials of one organization are isolated from credentials of another organization by using different encryption keys to encrypt the credentials of each different organization.

In some embodiments, the specific encryption key to be utilized to encrypt the credential is identified using the received authentication and/or received scope identifier. For example, an organization is identified using the received authentication and a scope encryption key specific to the organization is utilized to encrypt the received credential. In another example, a received scope identifier identifies a specific application execution environment of an identified organization and a scope encryption key specific to an identified execution environment of the organization is utilized to encrypt the received credential. The encrypted credential is stored in the credential store (e.g., stored in credential store 104 of FIG. 1).

In some embodiments, storing the credential includes associating the stored credential with a reference identifier of the stored credential. This identifier may be utilized by a developer to identify the credential and may be utilized to locate the specific credential in the credential store for retrieval. In some embodiments, a provider specified reference identifier has been received along with the received credential. In the event the received reference identifier is not unique, an error message may be provided to prompt a provider to provide another reference identifier. In some embodiments, the reference identifier is automatically assigned. For example, a credential store and/or application execution platform automatically determines a unique reference identifier of the stored credential. This automatically determined identifier may be provided to a provider of the received credential. In some embodiments, in the event the credential has been successfully stored in the credential store, an indication is provided that the credential has been successfully stored. In some embodiments, in the event the credential has not been successfully stored in the credential store, an error message is provided and the process ends.

At 308, a decryption key that can be utilized to decrypt the scope specific key encrypted credential is encrypted using a master key and stored in a key storage. For example, the decryption key is stored in a hardware security module (e.g., HSM 108 of FIG. 1) that encrypts the decryption key. The key storage may be various types of storage in various embodiments. In some embodiments, the decryption key is the same as the scope specific key. In some embodiments, the decryption key is different from the scope specific key and can be utilized to decrypt data encrypted using the scope specific key. In some embodiments, the key storage stores a plurality of different decryption keys encrypted using the same master key. In some embodiments, the key storage stores a plurality of different decryption keys that are each encrypted using different master keys.

In some embodiments, the master key is periodically and/or dynamically changed. For example, a master key is only valid for a limited amount of time. In some embodiments, changing the master key includes determining the new master key, decrypting the old master key encrypted decryption key and re-encrypting the decryption key using the new master key, and storing the newly encrypted decryption key in the key storage. In some embodiments, the master key is changed when indicated and/or based on one or more determined criteria.

Figure 4:
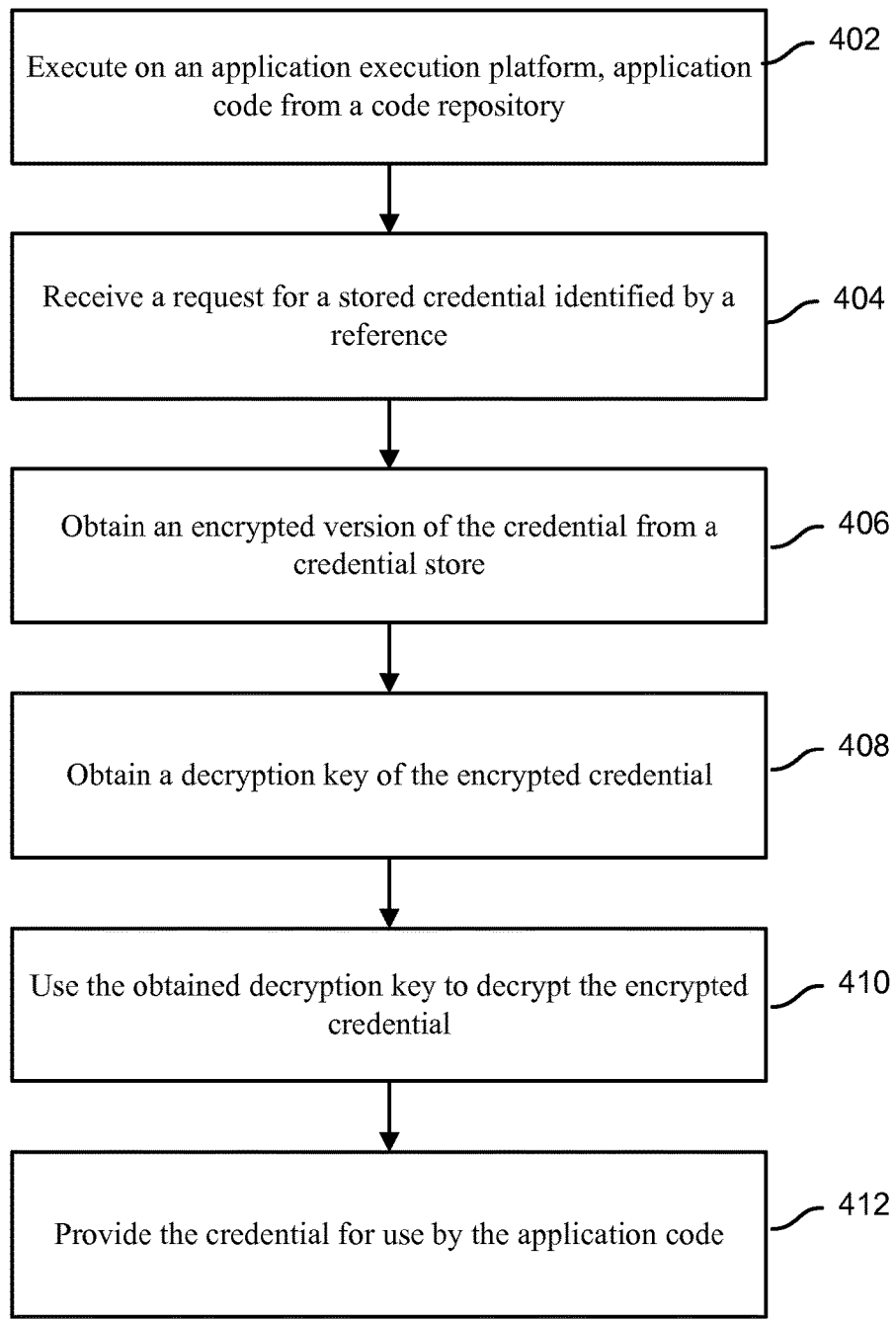
FIG. 4 is a flowchart illustrating an embodiment of a process for providing a credential from a credential store.

FIG. 4 is a flowchart illustrating an embodiment of a process for providing a credential from a credential store. The process of FIG. 4 may be implemented on server 102 of FIG. 1.

At 402, application code from a code repository is executed on an application execution platform. In some embodiments, the application code is the code provided in 208 of FIG. 2. For example, application code implementing an API is executed. The computer code may be executed dynamically, periodically, and/or when requested. For example, a request (e.g., API call) is received via a network (e.g., request received from a client application such as an application of user 120 of FIG. 1) and application code responsive to the request is obtained from the code repository and executed. In some embodiments, the application code may be continually executing.

At 404, a request for a stored credential identified by a reference is received. For example, the application code developed in 206 of FIG. 2 is executing and requests the stored credential. In some embodiments, the received request is an API request that requests the credential stored in a credential store. In some embodiments, the request for the stored credential is only valid if it is received from application code executing within the application execution platform of the credential store that stores the stored credential. In some embodiments, the request for the stored credential is only valid if it is requested from an authorized application code (e.g., application has been determined to be authorized). In some embodiments, in the event the request is determined to be invalid, an error message is provided and the process ends.

At 406, an encrypted version of the credential is obtained from a credential store. In some embodiments, obtaining the encrypted credential includes using the received reference of the credential to locate and obtain the encrypted credential from the credential store. In some embodiments, the obtained encrypted credential has been encrypted using a scope specific key and a decryption key is required to decrypt the encrypted credential.

At 408, a decryption key of the encrypted credential is obtained. In some embodiments, obtaining the decryption key includes identifying which scope specific key and/or corresponding decryption key corresponds to the credential. For example, the scope of the credential is determined by determining an execution environment scope of the application code that requested the credential (e.g., scope of the application code determined by identifying which entity and/or execution environment is executing the application code) and the key associated with the determined scope is identified. In some embodiments, the decryption key is stored in a key storage. For example, the decryption key is identified within the key storage using the determined scope and/or an identifier of the decryption key corresponding to the encrypted credential. In some embodiments, the decryption key has been encrypted using a master key and the decryption key is decrypted using a master key and/or a decryption master key. For example, the decryption key is obtained from a hardware security module (e.g., HSM 108 of FIG. 1) that encrypts keys stored in the module and decrypts keys obtained from the module.

At 410, the obtained decryption key is used to decrypt the encrypted credential.

At 412, the credential is provided for use by the application code. For example, the application code executing in the application execution platform utilizes the credential to access a backend service (e.g., backend service 116 of FIG. 1) and/or a third party service (e.g., third party service 114 of FIG. 1). In some embodiments, providing the credential includes responding to an API request for the credential.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for securing a credential, comprising:
   storing in a credential store a reference to the credential that is to be utilized to prove an authorization to provide access to a service and, in association with the reference, an encrypted version of the credential, wherein the reference is used to identify the credential;
   storing in a key storage an encrypted version of a decryption key of the encrypted version of the credential, wherein the key storage includes a hardware security module and the decryption key is used to decrypt the encrypted version of the credential, and wherein an encryption key utilized to encrypt the encrypted version of the credential is either exclusive to a specific organization or exclusive to and scoped to a specific application execution environment;
   providing the credential from the credential store to an application execution platform having access to the credential store, wherein the application execution platform includes an interface to access the service using the credential;
   storing in a code repository of the application execution platform, application code for a plurality of different applications, wherein the application code references the credential stored in the credential store, and wherein the application execution platform is configured to at least in part execute the plurality of different applications;
   executing, in an application execution environment, the application code that includes the reference to the credential stored in the credential store;
   obtaining a request from the application execution environment for the credential in response to execution of a portion of the application code that includes the reference to the credential stored in the credential store;
   determining whether the request is from execution of some application code within the application execution platform;
   in response to (i) obtaining the request from the application execution environment for the credential in response to execution of a portion of the application code that includes the reference to the credential stored in the credential store and (ii) determining that the request is valid because the request is from execution of some application code within the application execution platform, obtaining the encrypted version of the credential from the credential store based at least on the reference in the application code;
   determining a scope of the application execution environment executing the application code that includes the reference to the credential stored in the credential store;
   identifying the decryption key of the encrypted version of the credential based at least on the scope of the application execution environment executing the application code that includes the reference to the credential stored in the credential store;
   decrypting the decryption key of the encrypted version of the credential that is identified using the hardware security module and decrypting the encrypted version of the credential obtained from the credential store using the decrypted decryption key; and
   providing to the application execution environment of the application code the decrypted credential for access to the service on behalf of the application code.

2. The method of claim 1, wherein the credential interface to provide the credential is configured to only provide the credential to the application execution platform.

3. The method of claim 1, wherein the application execution platform has exclusive access to the credential store.

4. The method of claim 1, wherein the application execution platform has a physically secure access to the credential store.

5. The method of claim 1, wherein the application code cannot access the service without having access to the credential store.

6. The method of claim 1, wherein the application code that references the credential stored in the credential store references the credential using an Application Programming Interface of the application execution platform.

7. The method of claim 1, wherein the system includes a storage interface for receiving the credential for storage in the credential store.

8. The method of claim 1, wherein an encryption key utilized to encrypt the encrypted version of the credential is exclusive to a specific organization.

9. The method of claim 1, wherein the code repository stores and hosts application code that interacts with external program code via an Application Programming Interface to allow the external program code to access a backend service.

10. The method of claim 1, wherein the key storage stores a plurality of different decryption keys that are encrypted using a master key.

11. The method of claim 1, wherein the hardware security module is a dedicated physical crypto processing device.

12. The method of claim 1, wherein the credential includes a password.

13. The method of claim 1, wherein the application execution platform hosts an API of a backend service of a user application.

14. The method of claim 1, wherein the service is a database.

15. A system comprising:
one or more computers and one or more storage devices storing instructions that are operable, when executed by the one or more computers, to cause the one or more computers to perform operations comprising:
storing in a credential store a reference to a credential that is to be utilized to prove an authorization to provide access to a service and, in association with the reference, an encrypted version of the credential, wherein the reference is used to identify the credential;
storing in a key storage an encrypted version of a decryption key of the encrypted version of the credential, wherein the key storage includes a hardware security module and the decryption key is used to decrypt the encrypted version of the credential, and wherein an encryption key utilized to encrypt the encrypted version of the credential is either exclusive to a specific organization or exclusive to and scoped to a specific application execution environment;
providing the credential from the credential store to an application execution platform having access to the credential store, wherein the application execution platform includes an interface to access the service using the credential;
storing in a code repository of the application execution platform, application code for a plurality of different applications, wherein the application code references the credential stored in the credential store, and wherein the application execution platform is configured to at least in part execute the plurality of different applications;
executing, in an application execution environment, the application code that includes the reference to the credential stored in the credential store;
obtaining a request from the application execution environment for the credential in response to execution of a portion of the application code that includes the reference to the credential stored in the credential store;
determining whether the request is from execution of some application code within the application execution platform;
in response to (i) obtaining the request from the application execution environment for the credential in response to execution of a portion of the application code that includes the reference to the credential stored in the credential store and (ii) determining that the request is valid because the request is from execution of some application code within the application execution platform, obtaining the encrypted version of the credential from the credential store based at least on the reference in the application code;
determining a scope of the application execution environment executing the application code that includes the reference to the credential stored in the credential store;
identifying the decryption key of the encrypted version of the credential based at least on the scope of the application execution environment executing the application code that includes the reference to the credential stored in the credential store;
decrypting the decryption key of the encrypted version of the credential that is identified using the hardware security module and decrypting the encrypted version of the credential obtained from the credential store using the decrypted decryption key; and
providing to the application execution environment of the application code the decrypted credential for access to the service on behalf of the application code.

16. The system of claim 15, wherein the credential interface to provide the credential is configured to only provide the credential to the application execution platform.

17. The system of claim 15, wherein the application execution platform has exclusive access to the credential store.

18. The system of claim 15, wherein the application execution platform has a physically secure access to the credential store.

19. The system of claim 15, wherein the application code cannot access the service without having access to the credential store.

20. A non-transitory computer-readable medium storing software comprising instructions executable by one or more computers which, upon such execution, cause the one or more computers to perform operations comprising:
storing in a credential store a reference to a credential that is to be utilized to prove an authorization to provide access to a service and, in association with the reference, an encrypted version of the credential, wherein the reference is used to identify the credential;
storing in a key storage an encrypted version of a decryption key of the encrypted version of the credential, wherein the key storage includes a hardware security module and the decryption key is used to decrypt the encrypted version of the credential, and wherein an encryption key utilized to encrypt the encrypted version of the credential is either exclusive to a specific organization or exclusive to and scoped to a specific application execution environment;
providing the credential from the credential store to an application execution platform having access to the credential store, wherein the application execution platform includes an interface to access the service using the credential;
storing in a code repository of the application execution platform, application code for a plurality of different applications, wherein the application code references the credential stored in the credential store, and wherein the application execution platform is configured to at least in part execute the plurality of different applications;
executing, in an application execution environment, the application code that includes the reference to the credential stored in the credential store;
obtaining a request from the application execution environment for the credential in response to execution of a portion of the application code that includes the reference to the credential stored in the credential store;
determining whether the request is from execution of some application code within the application execution platform;
in response to (i) obtaining the request from the application execution environment for the credential in response to execution of a portion of the application code that includes the reference to the credential stored in the credential store and (ii) determining that the request is valid because the request is from execution of some application code within the application execution platform, obtaining the encrypted version of the credential from the credential store based at least on the reference in the application code;

determining a scope of the application execution environment executing the application code that includes the reference to the credential stored in the credential store;

identifying the decryption key of the encrypted version of the credential based at least on the scope of the application execution environment executing the application code that includes the reference to the credential stored in the credential store;

decrypting the decryption key of the encrypted version of the credential that is identified using the hardware security module and decrypting the encrypted version of the credential obtained from the credential store using the decrypted decryption key; and providing to the application execution environment of the application code the decrypted credential for access to the service on behalf of the application code.

* * * * *